(12) United States Patent
Gopalakrishnan et al.

(10) Patent No.: US 8,824,649 B2
(45) Date of Patent: *Sep. 2, 2014

(54) SYSTEMS AND METHODS FOR OPTIMIZING DISTRIBUTION OF ADVERTISEMENT INFORMATION

(71) Applicant: SAS Institute Inc., Cary, NC (US)

(72) Inventors: Balaji Gopalakrishnan, Cary, NC (US); William Elliot Inman, Cary, NC (US); Thomas Robert Lehman, Holly Springs, NC (US); John Clare Brocklebank, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,235

(22) Filed: Nov. 25, 2013

(65) Prior Publication Data
US 2014/0156382 A1 Jun. 5, 2014

Related U.S. Application Data

(63) Continuation of application No. 13/302,154, filed on Nov. 22, 2011, now Pat. No. 8,619,955.

(51) Int. Cl.
H04M 15/00 (2006.01)
G06Q 30/00 (2012.01)
H04L 29/08 (2006.01)
G06Q 30/02 (2012.01)

(52) U.S. Cl.
CPC ............ *G06Q 30/0244* (2013.01); *H04L 67/18* (2013.01); *G06Q 30/02* (2013.01)
USPC ................... 379/133; 379/112.01; 705/14.43; 705/14.57; 705/14.72

(58) Field of Classification Search
CPC .............. H04M 3/4878; H04M 15/00; H04M 2215/012; H04M 2215/0188; H06Q 20/10; H06Q 30/02; H06Q 30/0273; H06Q 30/0256; H06Q 30/0257; H06Q 30/0201; H06Q 30/0202; H06Q 30/0241; H06Q 30/0242; H06Q 30/0276; H06Q 30/0254; H06Q 30/0261
USPC .......... 379/111, 112.01, 112.05, 112.06, 133, 379/134, 139; 705/14.4, 14.41, 14.43, 705/14.45, 14.5, 14.57, 14.58, 14.72
See application file for complete search history.

(56) References Cited

U.S. PATENT DOCUMENTS 8,619,955 B2 12/2013 Gopalakrishnan et al.
(Continued)

*Primary Examiner* — Binh Tieu
(74) *Attorney, Agent, or Firm* — Kilpatrick Townsend & Stockton LLP

(57) ABSTRACT

In accordance with the teachings described herein, systems and methods are provided for optimizing distribution of advertisement information. In one example, call tracking data may be generated from a plurality of telephone calls made to a business entity, where the call tracking data includes geographical information to identify locations from which the plurality of telephone calls originated. A call distribution may be determined from the call tracking data, where the call distribution groups the call tracking data based at least in part on distances between the business entity and the locations from which the plurality of telephone calls originated. A probability density function may be generated from the call distribution, where the probability density function is for determining a probability that a telephone call will be received by the business entity in response to advertisement information delivered to a call location, and wherein the probability density function expresses the probability as a function of distance between the call location and the business entity. The probability density function may then be used in the generation of the advertisement distribution plan.

20 Claims, 14 Drawing Sheets

(56) References Cited

U.S. PATENT DOCUMENTS

| | | |
|---|---|---|
| 2002/0059273 A1 | 5/2002 | Morimoto et al. |
| 2007/0130014 A1 | 6/2007 | Altberg et al. |
| 2007/0157229 A1 | 7/2007 | Heathcock |
| 2008/0313039 A1 | 12/2008 | Altberg et al. |
| 2009/0100007 A1 | 4/2009 | Campbell et al. |
| 2012/0150627 A1* | 6/2012 | Hicken et al. .............. 705/14.42 |

* cited by examiner

US 8,824,649 B2

SYSTEMS AND METHODS FOR OPTIMIZING DISTRIBUTION OF ADVERTISEMENT INFORMATION

FIELD

The technology described in this patent document relates generally to computer-implemented optimization, and more particularly to systems and methods for optimizing distribution of advertisement information.

BACKGROUND

Mail-based advertising services typically distribute a selection of different print advertisements in a single envelope or mailer. The effectiveness of this type of advertising is often dependent on selecting the most optimal print advertisements for inclusion in the mailer.

SUMMARY

In accordance with the teachings described herein, systems and methods are provided for optimizing distribution of advertisement information. In one example, call tracking data may be generated from a plurality of telephone calls made to a business entity, where the call tracking data includes geographical information to identify locations from which the plurality of telephone calls originated. A call distribution may be determined from the call tracking data, where the call distribution groups the call tracking data based at least in part on distances between the business entity and the locations from which the plurality of telephone calls originated. A probability density function may be generated from the call distribution, where the probability density function is for determining a probability that a telephone call will be received by the business entity in response to advertisement information delivered to a call location, and wherein the probability density function expresses the probability as a function of distance between the call location and the business entity. The probability density function may then be used in the generation of the advertisement distribution plan.

In another example, call tracking data may be generated from telephone calls received by each of a plurality of businesses, where the call tracking data includes geographical information to identify locations from which the telephone calls originated and to associate each telephone call with a particular one of the plurality of businesses that received the call. A probability density function may be generated for each of the plurality of businesses based on the call tracking data, where the probability density function is for determining a probability that a telephone call will be received by the business in response to advertisement information delivered to a call location, and wherein the probability density function expresses the probability as a function of distance between the call location and the business. The probability density function may be used to perform a plurality of simulations for each of the plurality of businesses, where the simulations predict calls to be generated in response to a distribution of advertisement information to call locations within a geographic area. The results of the plurality of simulations may be provided for use in generating an advertisement distribution plan for the geographic area.

DETAILED DESCRIPTION

Figure 1:
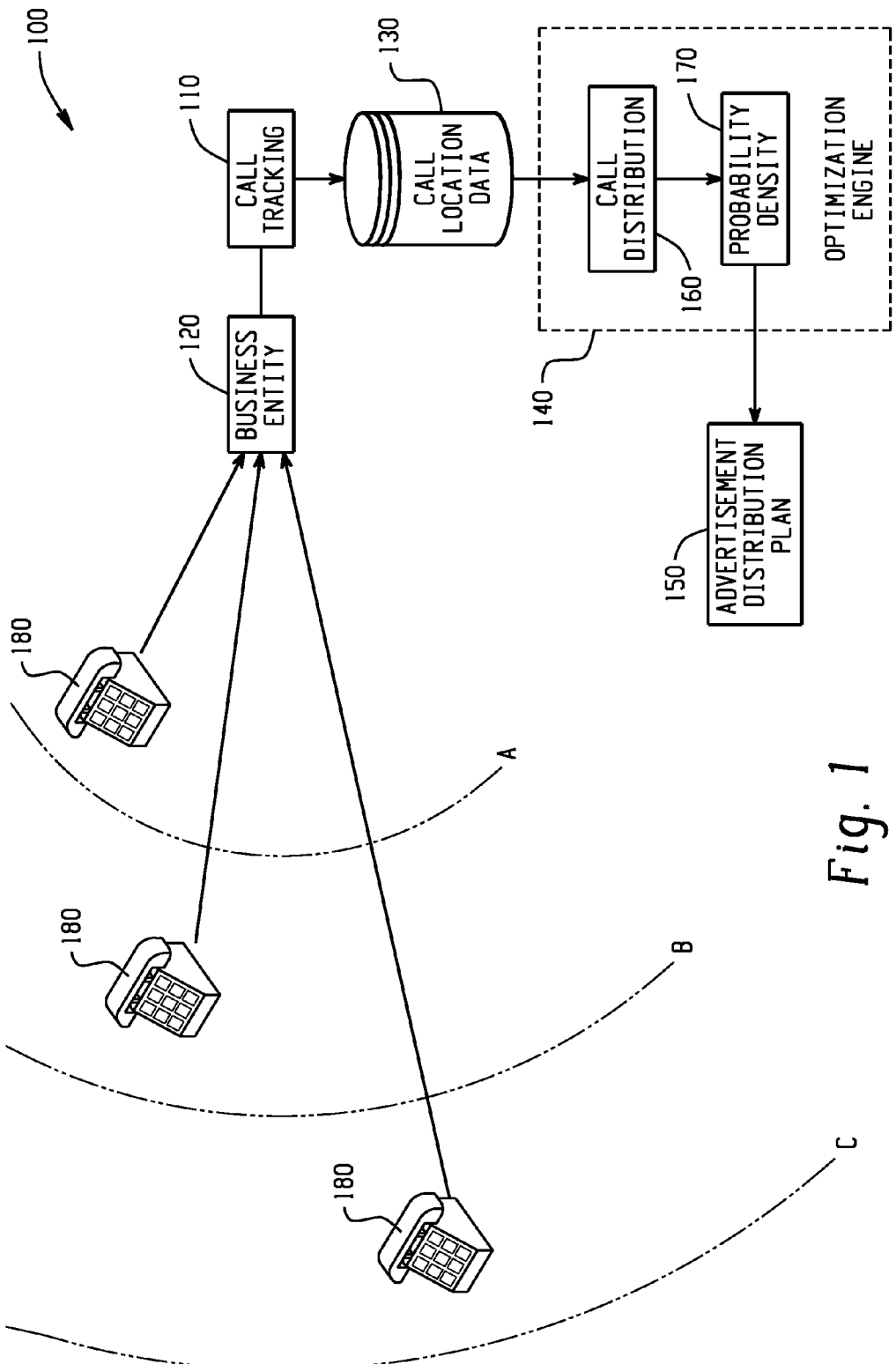
FIG. 1 is a block diagram of an example system for optimizing the distribution of advertisement materials within a geographical area.

FIG. 1 is a block diagram of an example system 100 for optimizing the distribution of advertisement materials within a geographical area. The system 100 includes a call tracking application 110 for tracking calls received by one or more business entities 120 and recording call tracking data in a call location database 130 to identify locations from which the calls originated. The system 100 further includes an optimization engine 140 that determines an optimal advertisement distribution plan 150 based on the call tracking data 130 using a call distribution block 160 and a probability density block 170. The call tracking application 110 and the call location database 130 may, for example, be implemented on one or more computers at a remote call tracking center, or in another example may be implemented on one or more computers located at the business entity. The optimization engine 130 may be implemented as part of the same software package as the call tracking application 110, or in other examples may be implemented separately from the call tracking application 110.

In operation, the call tracking application 110 determines the location of an advertising lead (i.e., a call from a potential customer) received by the business entity 120, for example by performing a reverse look-up operation on the phone number of the tracked call. The call distribution block 160 uses the call location data 130 to determine a geo-coded distribution of advertising leads for the business entity 120. The geo-coded leads distribution may be determined by grouping the call tracking data based, at least in part, on some measure of the distances between the business entity 120 and the locations 180 from which the tracked calls originated. For instance, in the illustrated example, three radial distances from the business entity 120 are shown with dotted lines labeled A, B and C. In this example, the call distribution block 160 may group received advertising leads into four geographical regions that include leads received from within radial distance A, leads received from a location between distances A and B, leads received from a location between distances B and C, and leads received from outside of distance C. It should be understood, however, that in other examples the distances between the advertising leads 180 and the business entity 120 could be measured in ways other than radial distance. For instance, in other examples the distribution 160 could be based on the city blocks (or other geographical regions) from which the leads 180 were received.

The probability density block 170 uses the geo-coded leads distribution to generate a probability density function for determining a probability that an advertising lead will be received by the business entity 120 in response to advertisement information delivered to a location at a certain distance from the business entity. The probability density function may then be provided for use in creating the advertisement distribution plan 150. An example of how the probability density function may be calculated is illustrated in FIG. 2.

Figure 2:
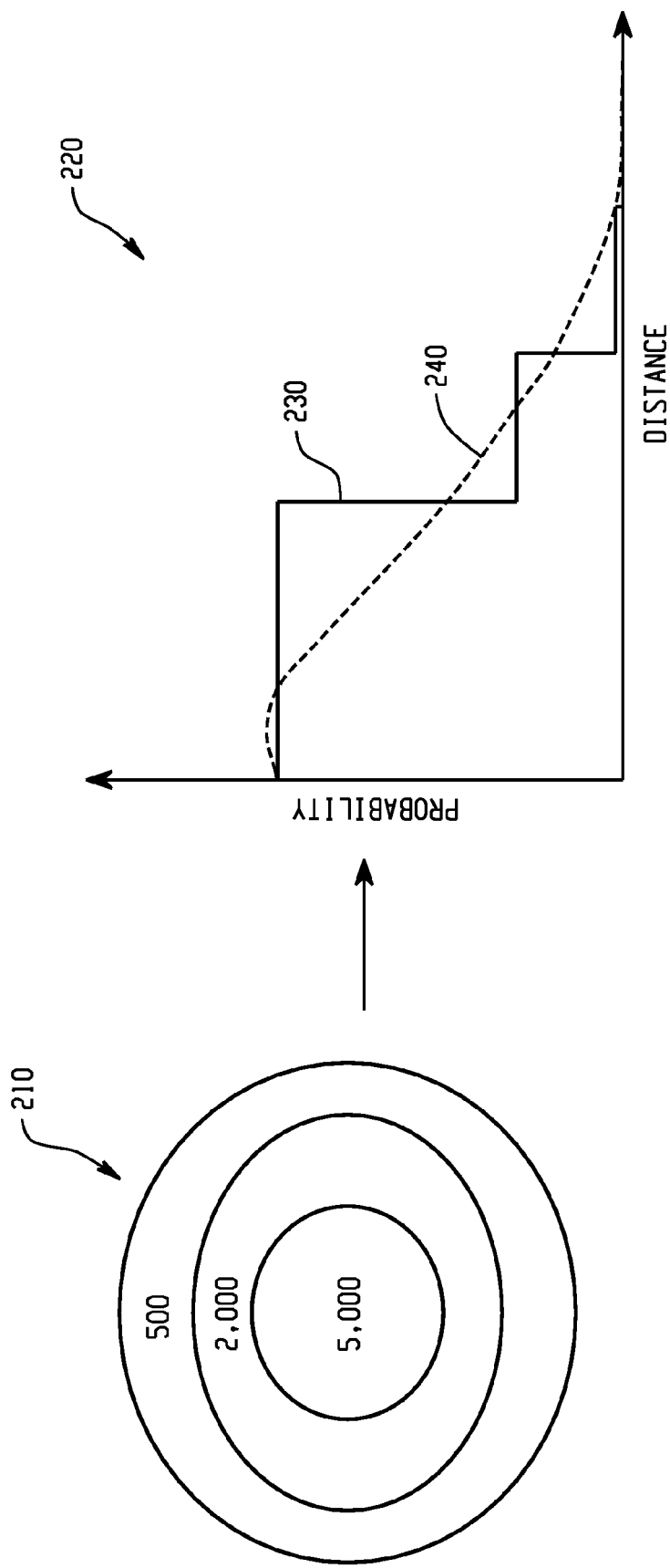
FIG. 2 includes an example contour map showing a geo-coded leads distribution for a business entity and an example probability density function generated from the distribution.

FIG. 2 includes an example contour map 210 showing a geo-coded leads distribution for a business entity. In the illustrated example, the contour map 210 shows that the geographic area closest to the business entity generated 5000 leads, the next closest geographic area generated 2000 leads and the geographic area furthest from the business entity generated 500 leads. As shown on the right-hand side of FIG. 2, this call distribution data 210 may be used to determine a probability density function 220 that identifies the probability of an advertisement generating leads for the business entity as a function of the distance between the call location and the business entity. Specifically, a step function 230 is first generated by calculating a probability score for each geographic region of the contour map 210. For instance, in the illustrated example, the probability of receiving a lead (i.e., the probability score) from within the inner-most region of the contour map is 0.667 ($5000/7500$), the probability score from the middle region is 0.267 ($2000/7500$) and the probability score from the outer region is 0.067 ($500/7500$). The step function 230 may then be smoothed to generate a probability density curve 240.

The probability density function 220 may be used, either by itself or along with probability density functions for other business entities, to establish an advertisement distribution plan, as illustrated in FIG. 1. For instance, it may be determined that print advertisements for a business entity will only be distributed to geographical areas in which the probability of receiving a lead meets a predetermined threshold. In the case of an advertisement mailer containing multiple advertisements, the mailer may be optimized by specifically tailoring the mailer to a particular geographic region. For instance, the advertisement mailer may be packed with only advertisements for business entities that show a predetermined probability of generating a lead within the target distribution area. In other examples, the probability density function(s) may be used to run multiple simulations, which are then used as a basis for deriving the advertisement distribution plan 150 (e.g., as illustrated in FIG. 3.)

Figure 3:
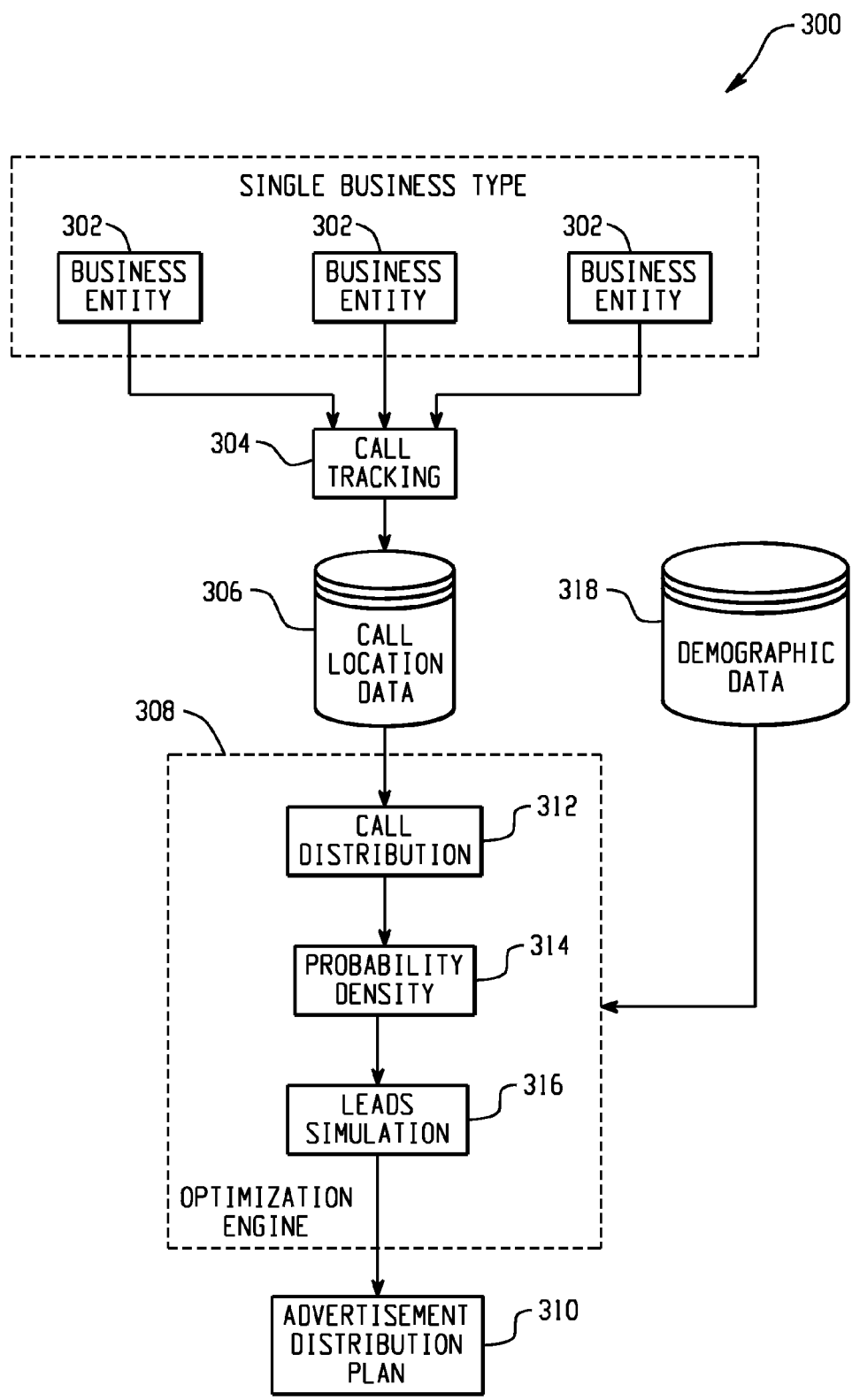
FIG. 3 illustrates another example system in which call data is tracked for multiple business entities.

FIG. 3 illustrates another example system 300 in which call data is tracked for multiple business entities 302. In this example, the business entities 302 are different businesses or business locations for the same type of business. For instance, all of the business entities 302 could be flower boutiques or some other business type. In another example, the business entities 302 could include different locations of the same business or business franchise.

A call tracking application tracks calls received by each of the business entities 302 and records call tracking data in a call location database 306. The call tracking data 306 includes information to identify the particular business entity 302 that received the call and to identify the location from which the call originated. The system 300 further includes an optimization engine 308 that determines an optimal advertisement distribution plan 310 based, at least in part, on the call tracking data 306. The optimization engine 308 includes a call distribution block 312, a probability density block 314 and a leads simulation block 316. In addition, the optimization engine 308 may also receive demographic data 318 that is used in combination with the call tracking data 306 to generate the advertisement distribution plan 310.

In operation, the call tracking application 304 determines the locations of advertising leads received by the business entities 302, for example by performing a reverse look-up operation on the phone numbers of the tracked calls, and stores the call location data in the call location database 306 in association with information identifying the particular business entity 302 that received the call. The call distribution block 312 aggregates the call location data 306 from all of the business entities 302 associated with the same business type, and uses the aggregated data to determine a geo-coded distribution of advertising leads for the business type.

Figure 4:
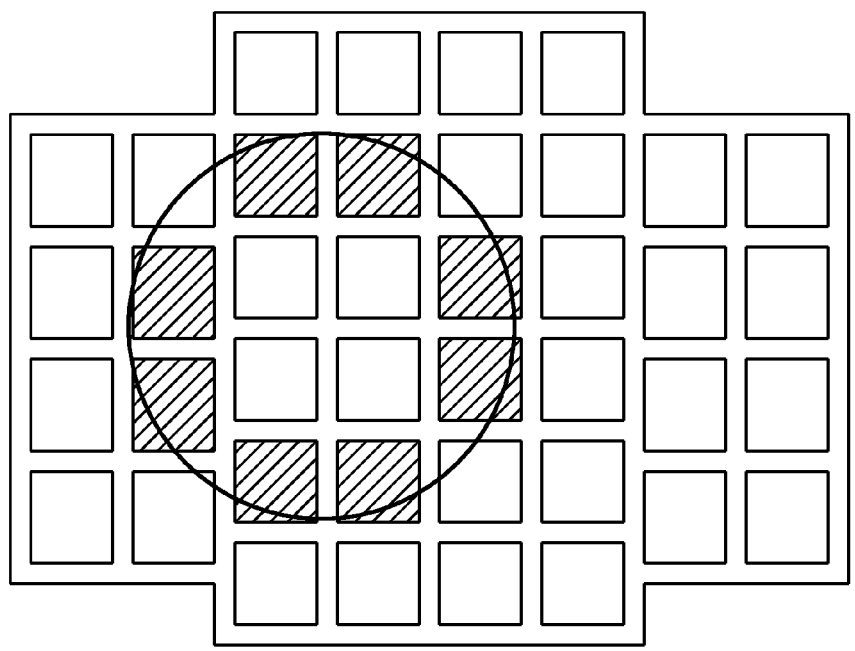
FIG. 4 illustrates example geographic units that may serve as a basis for a geo-coded leads distribution.

The geo-coded call distribution data may be determined by grouping the call tracking data based on some measure of the distances between the business entities 302 and the locations from which the tracked calls originated. For instance, as shown in FIG. 4, the distribution could be based on the city blocks (or other geographical regions, such as postal ZIP code) from which the calls originated, where blocks that are at the same distance from the business entity are grouped together, as represented by the circle in FIG. 4. The block-level (or region-level) probability distribution can be determined by considering only blocks having a centroid located inside the circle with a radius equal to a fixed distance from the business entity. For instance, in the example shown in FIG. 4, the shaded blocks are the ones that are considered when calculating the probability of leads generated by blocks at a particular distance from the business entity.

With reference again to FIG. 3, the probability density block 314 uses the geo-coded leads distribution to generate a probability density function for determining a probability that an advertising lead will be received by one of the business entities 302 in response to advertisement information delivered to a location at a certain distance from the business entity 302. As shown, demographic data 318 may also be used to influence this probability function. For example, the probability density block 314 may take into account demographic data for the blocks or other geographic regions within the call distribution when generating the probability density function. For instance, for certain types of business entities the probability of receiving a lead from a residential block may be higher than the probability of receiving a lead from a commercially-zoned block, and this demographic information may be used to adjust the probability density function.

The probability density function may then be provided for use in creating the advertisement distribution plan 310. As illustrated, this may be performed by utilizing a leads simulation block 316. The leads simulation 316 may, for example, be used to simulate the distribution of leads to blocks (or other geographic regions) around the business location based on the probability density function. A simulation run may consist of generating a pair of random numbers (d,b) for each recorded lead for an advertiser, where "d" is drawn from the geo-coded leads distribution and "b" is drawn from a uniform distribution using the probability score from the probability density function of all blocks (or other geographic regions) at the distance "d" form the business entity. By aggregating the simulation results from all advertisers, it can be determined how many leads are generated from each block and the variance around the block level leads estimates.

Figure 5:
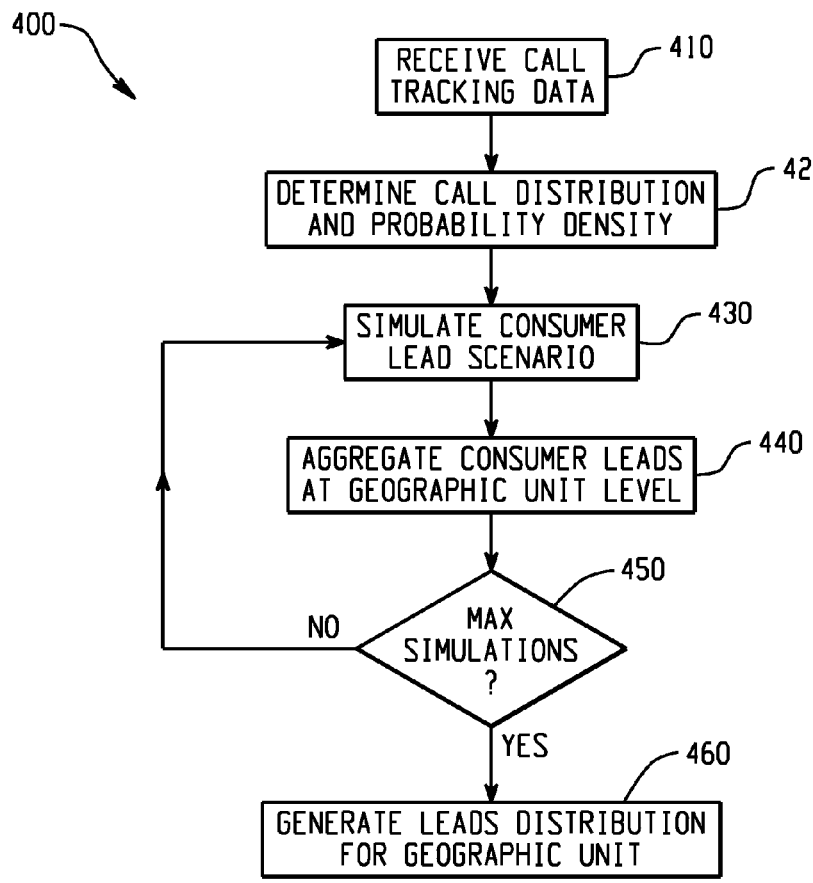
FIG. 5 is a flow diagram of an example method for optimizing the distribution of advertisement materials within a geographical area.

FIG. 5 is a flow diagram of an example method for optimizing the distribution of advertisement materials within a geographical area. At 410, call tracking data for one or more business entities is received, for example from a call location database. A geo-coded call distribution and probability density function is then generated from the call tracking data at 420, for example as described above with reference to FIG. 1 and FIG. 3. At 430, the probability density function is used to simulate a lead scenario for the geographic area of interest. If the simulation involves multiple related business entities, such as multiple business entities of the same type or multiple locations of the same business entity, then the leads simulations for each of the business entities are aggregated at the geographic unit level (e.g., at the block level) at 440.

At 450, it is determined if a preset number of simulation runs have been performed. If not, then the method returns to 430 and another simulation run is performed and recorded. Once the predetermined number of simulation runs have been completed, the method proceeds to 460. At 460, a leads distribution for the geographic unit is generated based on the simulation runs, for example based on a mean of the leads distribution from each of the simulation runs. The resultant leads distribution for the geographic unit may then be used in an optimization problem, possibly along with leads distributions for other business entities and/or other geographic units, to implement an advertisement distribution plan that maximizes leads generation for the advertisers (e.g., as described below with reference to FIGS. 13 and 14). In this way, print advertisement leads may be maximized while satisfying print distribution costs and any other business rules specific to the particular advertising campaign.

Figure 6:
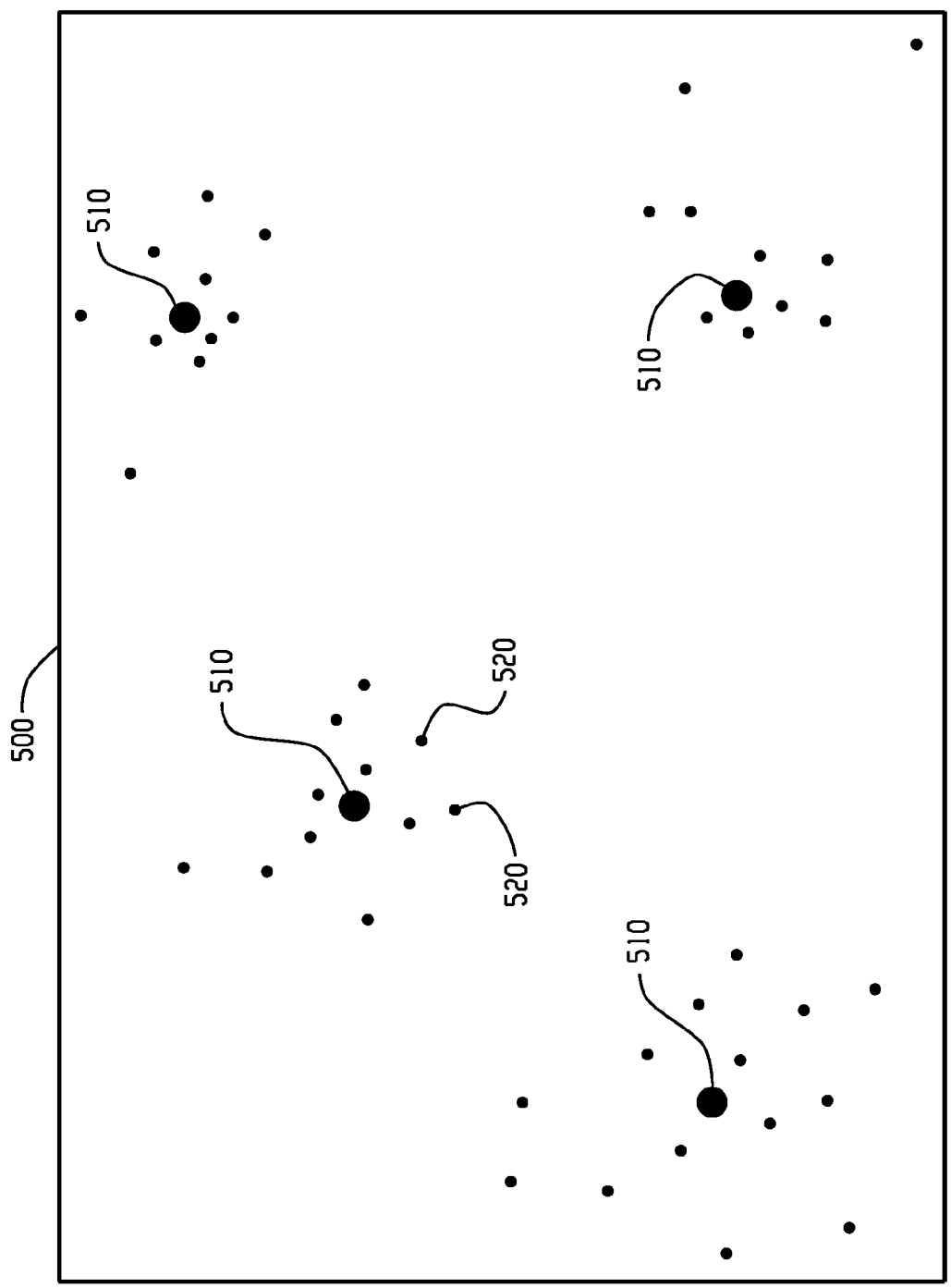
FIGS. 6-10 illustrate an example implementation of the method of FIG. 5.

FIGS. 6-10 illustrate an example implementation of the method of FIG. 5. FIG. 6 is a map that illustrates four example business entities 510 and the locations of advertising leads 520 received by each of the business entities 510. The large dots on the map represent the business entities and the smaller dots represent the advertising leads. The business entities 510 in this example are four businesses of the same type, such as flower boutiques, spread throughout the continental United States. The business entities 510 may, for example, be chosen as a representative sample to save on the costs of expensive call tracking data. For instance, the business entities 510 illustrated in FIG. 6 may be four flower boutiques that are representative of all of the flower boutiques participating in the advertising campaign. The captured call tracking data 520, represented by the small dots on the map shown in FIG. 6, may include the location from which the calls were made (e.g., using call tracking information and GPS coordinates) as well as the name of the business entity 510 to which the call was made.

Figure 7:
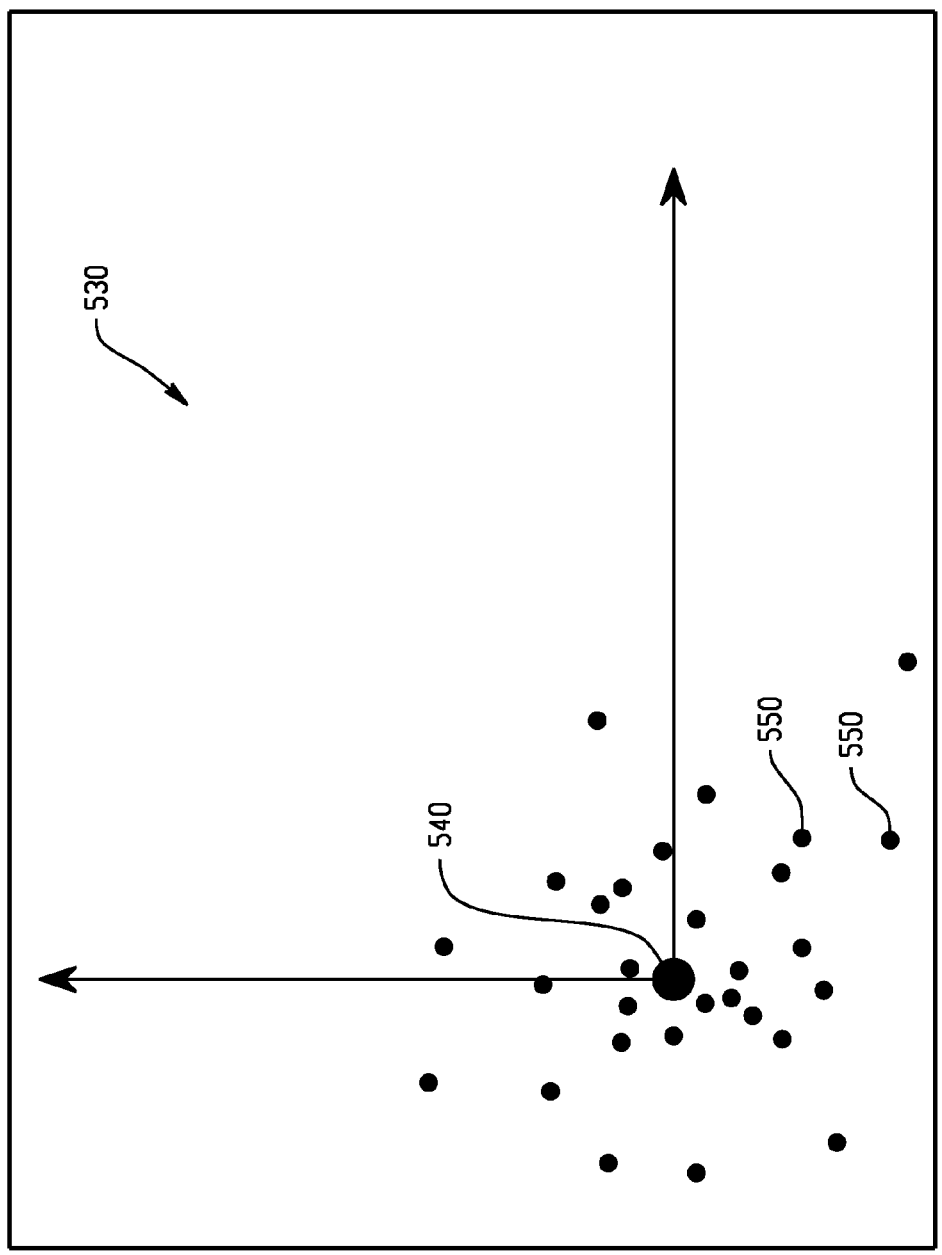
Figure 8:
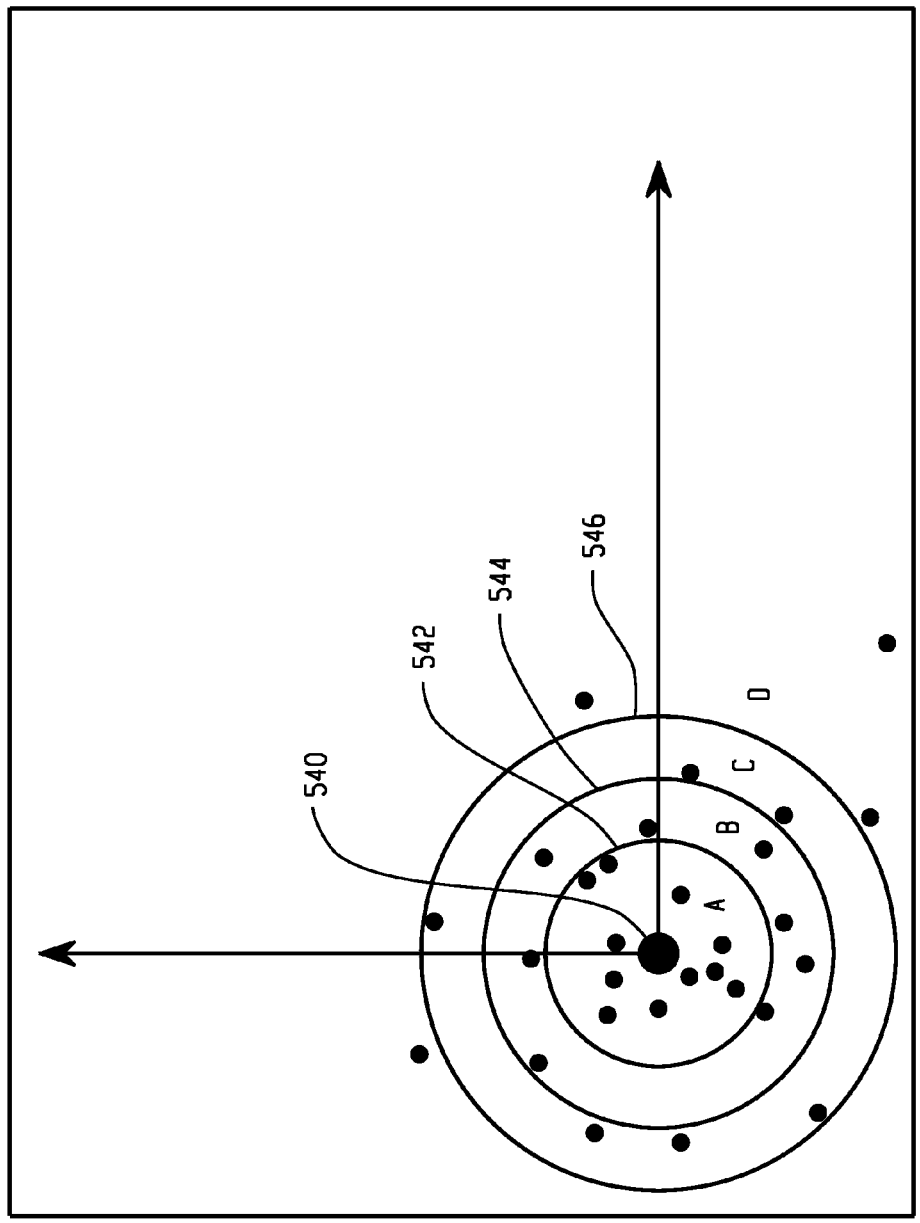

In FIG. 7, the call tracking data for all of the related business entities (510 in FIG. 6) is aggregated into a single call distribution plot 530 that shows the distribution of calls made to the related business entities in general as a function of distance from the business entity. The large dot 540 in FIG. 7, located at the intersection of the two axes, represents all four of the related business entities (510), and the smaller dots 550 show the distribution of the advertising leads received by the business entities. In FIG. 8, radial distance information is added to the plot to create a geo-coded distribution that separates the received advertising leads into zones based on the distance from the business entity 540. In the illustrated example, the leads are separated into four zones A-D based on their radial distance from the business entity 540. Specifically, zone A includes all of the received leads within a first radial distance 542, zone B includes the received leads between the first radial distance 542 and a second radial distance 544, zone C includes the leads between the second radial distance 544 and a third radial distance 546, and zone D includes the leads outside of the third radial distance 546. In the illustrated example, it can be seen that call density (e.g., calls per square mile) is higher closer to the shop, with the highest call density being in zone A and the lowest call density being in zone D.

Figure 9:
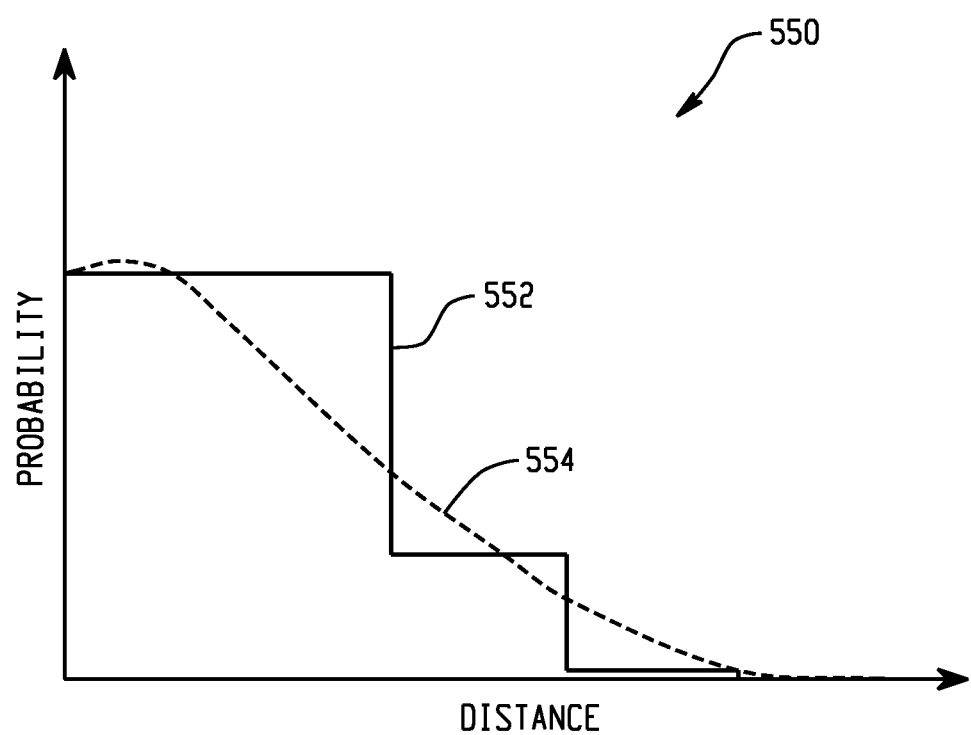

The relationship between the call density and distance to a business obtained from the call tracking data is then used to define a mathematical probability density function 550, as illustrated in FIG. 9. The probability density function 550 measures the probability of receiving an advertising lead from a particular distance from the business location. As explained above with reference to FIG. 2, the geo-coded distribution may be used to first generate a step function 552 that indicates the probability of receiving an advertising lead from within each geographic area (e.g., zones A-D in FIG. 8). The step function 552 may then be smoothed to generated a probability density curve 554.

It should be understood that the geo-coded distribution and the resultant probability density function 550 may be different for different businesses. For example, an attorney might regularly receive calls from clients located over 100 miles from the attorney's office, a dentist might regularly receive calls within 50 miles of the location of the dentist's office, and a pizzeria might receive most of their calls from within 10 miles of the business location. Another factor for calls made to a business is the demographics of a specific geographic location. Publically available data on demographic makeup of a region (e.g., number of males and females, age groups, annual income levels, crime rates, etc.) can be used along with the geo-coded call distribution information to build predictive models that predict the probability that a region will generate a call for a certain type of business. For example, predictive models such as decision trees and logistic regression may be used for this purpose.

An important question for a print advertising agency may be to understand the geographical distribution of leads recorded for a specific business using the distance and demographic models for customer calls generation. For example, if the advertising agency has data that shows that three flower boutique shops in Raleigh, N.C. have received 120, 90 and 75 calls respectively, then a natural question is to find out, with some level of certainty, which geographic blocks surrounding these businesses are generating these calls (assuming that call location data is not available to track the exact location of all of the calls.) This example is illustrated in FIG. 10.

Figure 10:
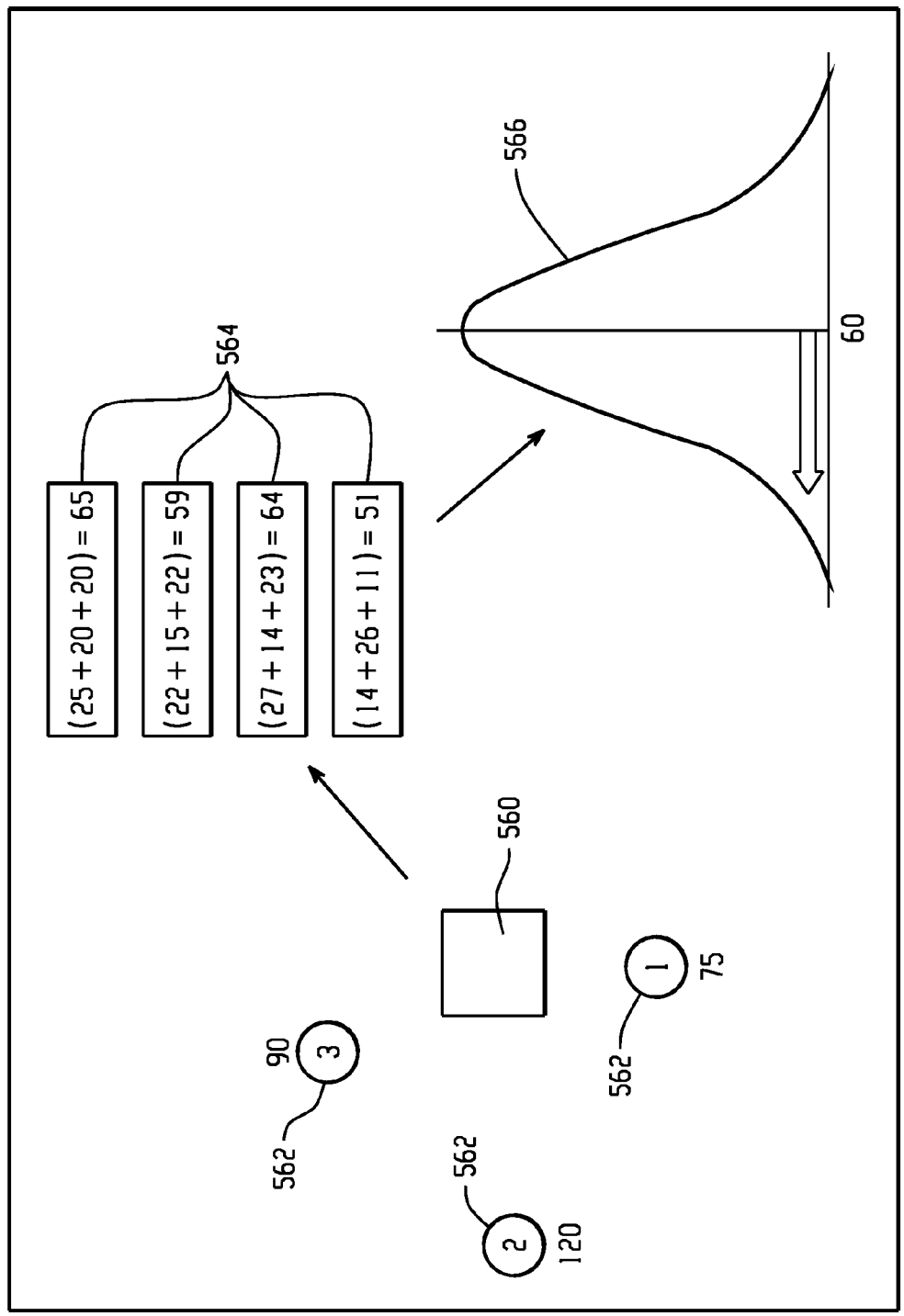

In the example illustrated in FIG. 10, the probability distribution function for a particular geographic area 560 (e.g., a block) is used to determine the probable number of calls received by a business or group of businesses from that block 560. In the illustrated example, there are three business locations 562 (labeled locations 1-3), which respectively received 75, 120 and 90 calls during an advertising campaign. In this example, the probability density function is used in a plurality of simulation runs 564 to determine how many of those 285 total calls were likely made from within the geographic area 560. In a first simulation run, the probability density function predicts that 25 calls were made from the geographic area 560 to the first business location and 20 calls were made to each of the other two business locations, resulting in a total of 75 calls from the geographic area 560 to the three business locations 562. In the next three simulation runs, the probability density function predicts call totals of 59, 64 and 51 from the geographic location 560. The simulation results may then used to generate a call distribution 566 for the geographic area 560, for example using a maximum likelihood estimation. The mean of the distribution (61 in the illustrated example) can then be attributed to the most likely estimate of the number of leads generated for the business locations 562 from the particular geographic area 560. If desired, the mean of the call distribution 566 can be shifted (as illustrated by the arrow in FIG. 10) to provide a down side risk measure to mitigate risk.

It should be understood that although four simulations 564 are illustrated in the example shown in FIG. 10, many more simulations may be used to provide a more certain result. In addition, similar simulations may be conducted using probability density functions from different geographic areas and/or for different businesses. The call distribution data from these simulation runs may then be used by an advertising agency to generate an advertisement plan that is optimized at the level of the geographic unit (e.g., at the block level). For instance, in a mailer advertisement campaign, simulation results for numerous business types may be used to stuff the mailer with advertisements that are optimal for a targeted block. In addition, an optimization problem may be solved to determine the most effective way to target the geographic areas (e.g., blocks) with print advertisement materials that maximize the total leads generated for the advertisers while satisfying resource constraints, such as printing spend constraints, geographic and business specific spend constraints, etc.

Figure 11:
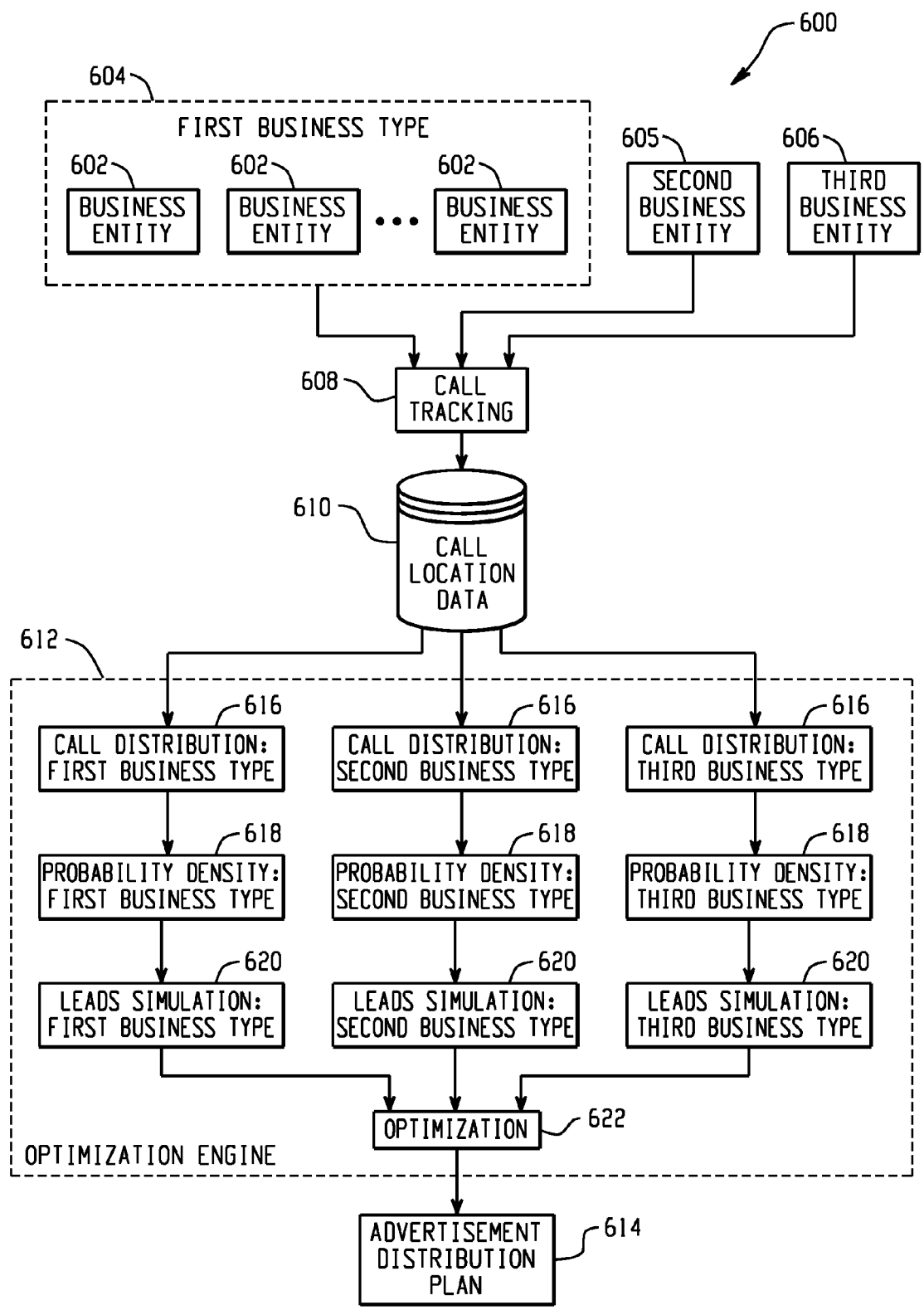
FIG. 11 is a block diagram illustrating another example system in which call data is tracked for multiple business entities to be included in a multi-business advertising campaign.

FIG. 11 is a block diagram illustrating another example system 600 in which call data is tracked for multiple business entities 602 to be included in a multi-business advertising campaign. In this example, the business entities 602 include multiple types of businesses 604-606, where each business type includes one or more business entities 602. For instance, one business type 604 may include one or more flower shops, another business type 605 may include one or more automotive repair shops, another business type 606 may include one or more dentists, etc.

A call tracking application 608 tracks calls received by business entities 602 for each of the business types 604-605 and records call tracking data in a call location database 610. To reduce costs, the call tracking application 608 may, for example, only track a sample of the calls received by the business entities 602 and may track calls for less than all of the business entities 602 in a business type 604-606. The call tracking data 610 includes information to identify the particular business entity 602 that received the call and to identify the location from which the call originated. The system 600 further includes an optimization engine 612 that determines one or more optimal advertisement distribution plans 614 for the businesses 604-606 included in the advertising campaign based, at least in part, on the call tracking data 610. The optimization engine 612 includes an instance of a call distribution block 616, a probability density block 618 and a leads simulation block 620 for each of the business types 604-606. In addition, the optimization engine 612 further includes an optimization block 622.

In operation, the call tracking application 608 determines the locations of advertising leads received by the business entities 602 for each business type 604-606, for example by performing a reverse look-up operation on the phone numbers of the tracked calls, and stores the location data in the call location database 610 in association with information identifying the particular business entity 602 that received the call. The call distribution blocks 616 each aggregate the call location data 610 from the business entities 602 for a business type 604-606, and use the aggregated data to determine a geo-coded distribution of advertising leads. In this way, a geo-coded leads distribution is generated for each different business type 604-606 in the advertising campaign.

The probability density blocks 618 use the geo-coded leads distributions to generate a probability density function for each business type 604-606. The probability density functions identify, for each business type 604-606, a probability that an advertising lead will be received by a business entity 602 as a function of distance from the call location. Although not illustrated in FIG. 11, this probability calculation may also by influenced by demographic data relating to the geographic area. The probability density functions are then used to simulate the distribution of leads to geographic regions (e.g., blocks) around the business locations for each business entity 604-606, for example as described above with reference to FIG. 10. The simulation results for each business type may then be used by the optimization block 622 to generate an advertisement distribution plan 614 for the group of businesses 604-606. An example of this optimization process is illustrated in FIGS. 12 and 13.

Figure 12:
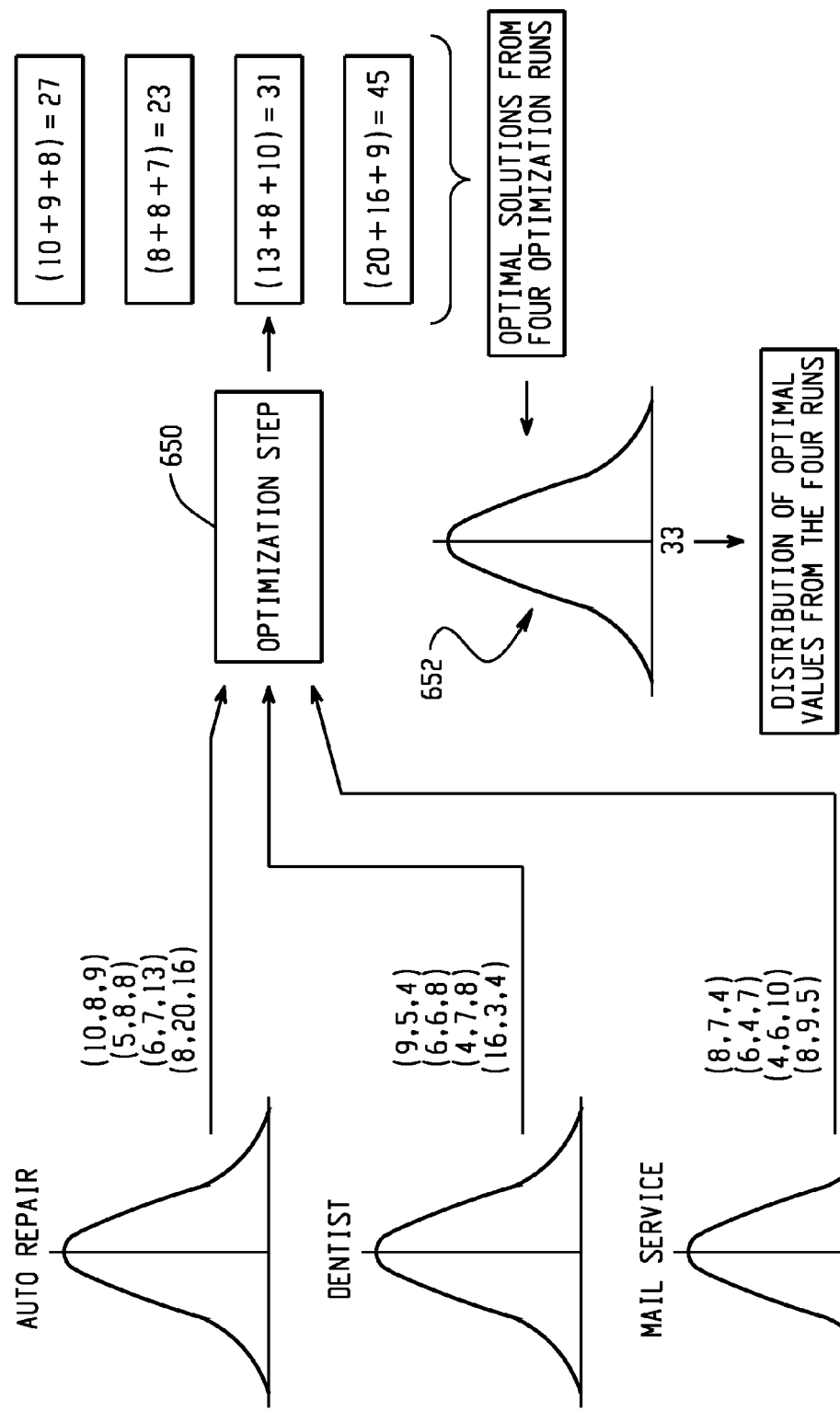
FIGS. 12 and 13 illustrate an example advertisement distribution optimization process.

In the example illustrated in FIG. 12, leads simulation data is received for three different business types—auto repair businesses, dentists, and mail service businesses. In the illustrated example, four simulation runs are performed based on three business locations for each business type. For instance, in the first simulation run, predicted leads of (10, 8, 9) are determined for three auto repair business locations, predicted leads of (9, 5, 4) are determined for three dentist locations, and predicted leads of (8,7,4) are determined for three mail service locations. It should be understood that although four simulation runs are shown for the purpose of the illustrated example, many more simulation runs may be used to increase accuracy.

An optimization step 650 is then performed on the predicted leads data to generate optimal solutions from each of the simulation runs. This is performed by selecting the best result for each business type and summing them to generate the optimal solution for the simulation run. For instance, for the first simulation run in the illustrated example, the highest predicted lead value of 10 is selected from the first set of auto repair leads (10, 8, 9), the highest predicted lead value of 9 is selected from the first set of dentist leads (9, 5, 4) and the highest predicted lead 8 is selected from the first set of mail service leads (8,7,4), and the selected leads are summed (10+9+8) to determine the optimal solution of 27 for the first simulation run. This process is repeated for each of the simulation runs, resulting in optimal solutions of 27, 23, 31 and 45 in the illustrated example. The mean of the optimal solutions (33 in the illustrated example) may then be calculated to generate a distribution 652 of optimal values from the simulation runs.

Figure 13:
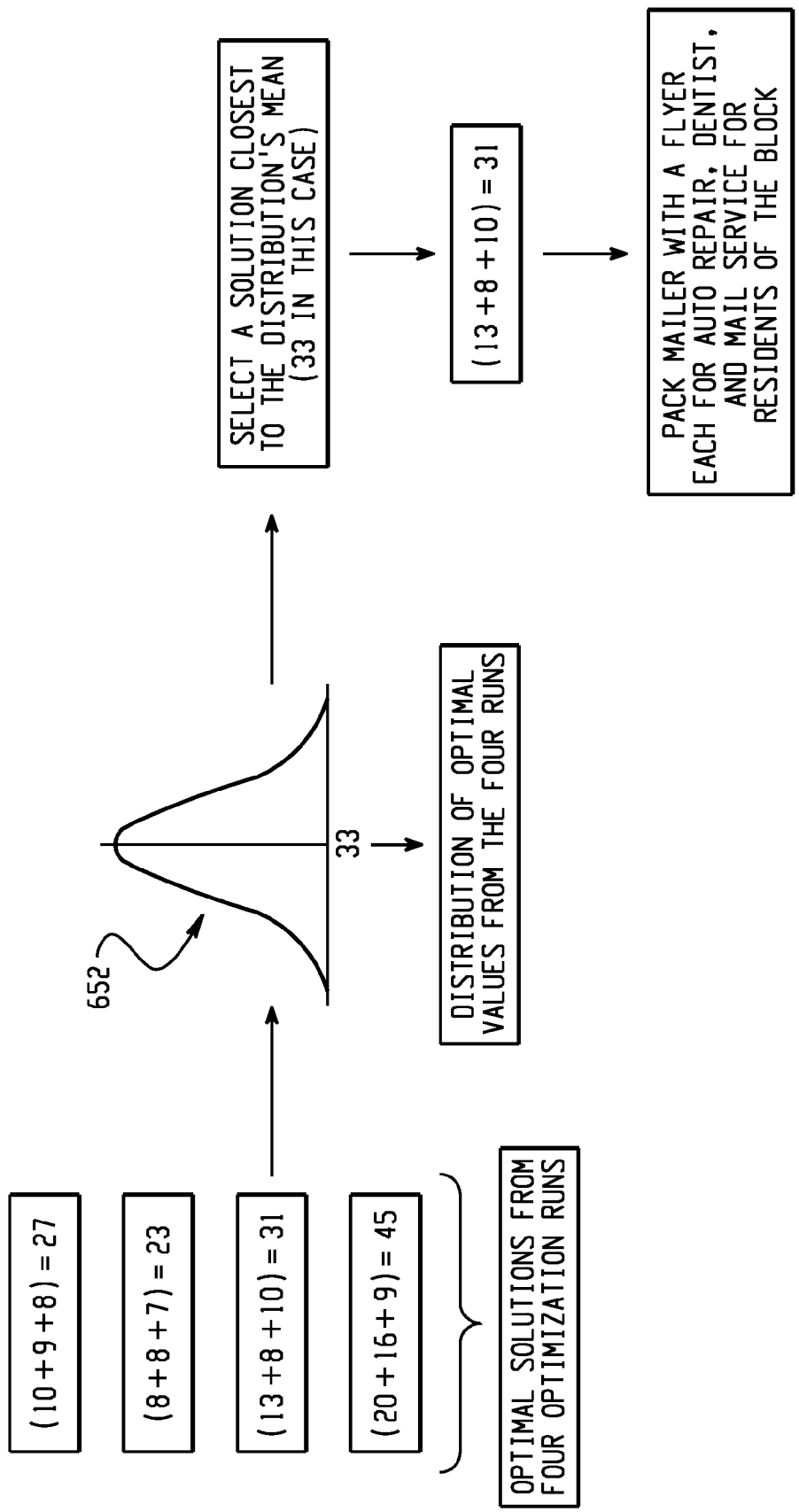

FIG. 13 illustrates an example of how an advertisement distribution plan may be generated based on the simulation results of FIG. 12. FIG. 13 shows the distribution 652 of optimal values from the simulation runs that is determined from the optimal simulation solutions, as described above with reference to FIG. 12. In the illustrated example, the distribution 652 has a mean value of 33. One of the optimal solutions from the simulation runs is then selected that is closest to the distribution's mean. In this example, the optimal solution from the third simulation run, (13+8+10)=31, is the closest to the mean value of 33 and is therefore selected. From this selected solution, an advertiser may determine which advertising materials to include in a distribution, such as a print advertisement mailer. For instance, in the illustrated example, the selected optimal solution predicts that the advertisement distribution will result in 13 leads for the auto repair businesses, 8 leads for the dentists and 10 leads for the mail services businesses. Accordingly, based on this information, the advertiser may include print advertisements from all three of these businesses in an advertisement mailer. If, on the other hand, the selected optimal solution had predicted that one of the businesses would receive no leads, or would receive less than a threshold number of leads, then the advertiser may leave advertisements for this business out of the mailer.

Figure 14A:
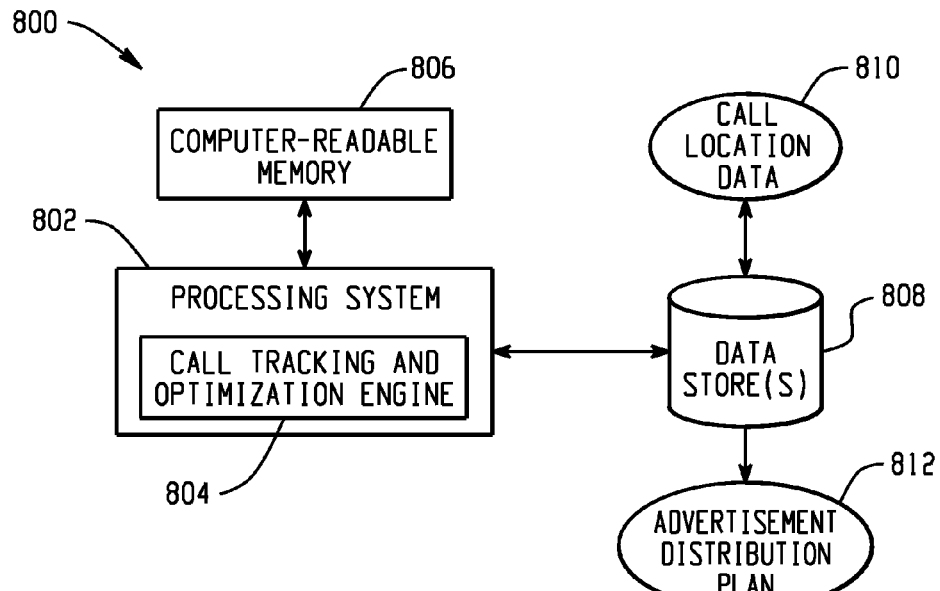
FIGS. 14A, 14B and 14C depict examples of systems that may be used to optimize the distribution of advertisement information.
Figure 14B:
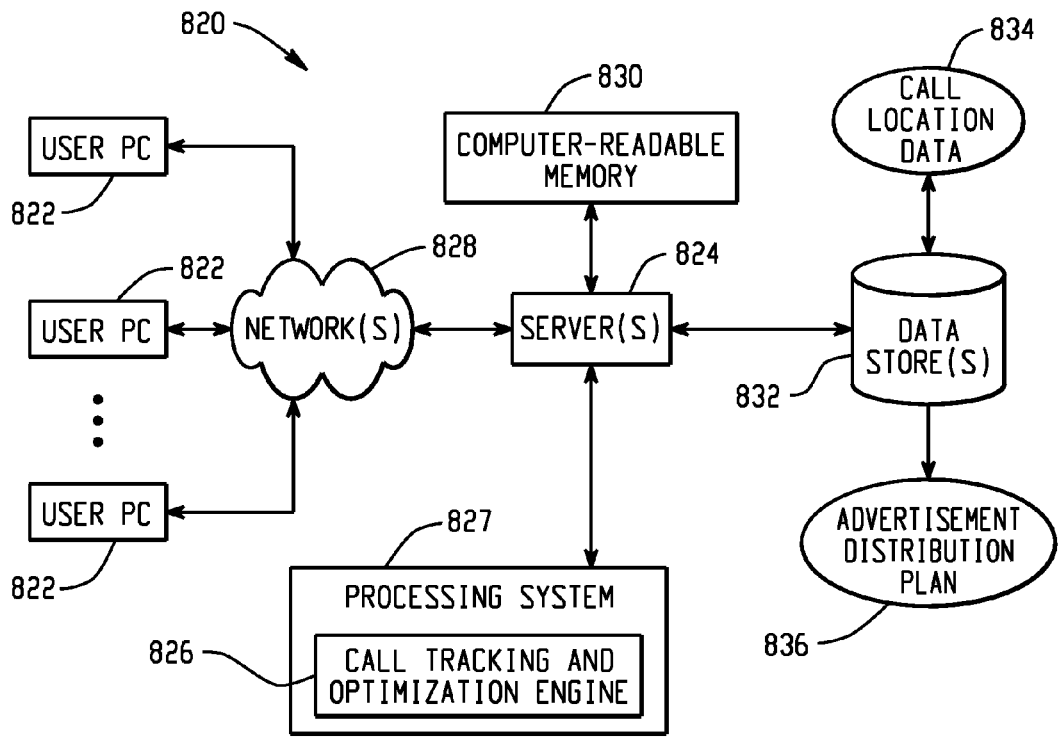
Figure 14C:
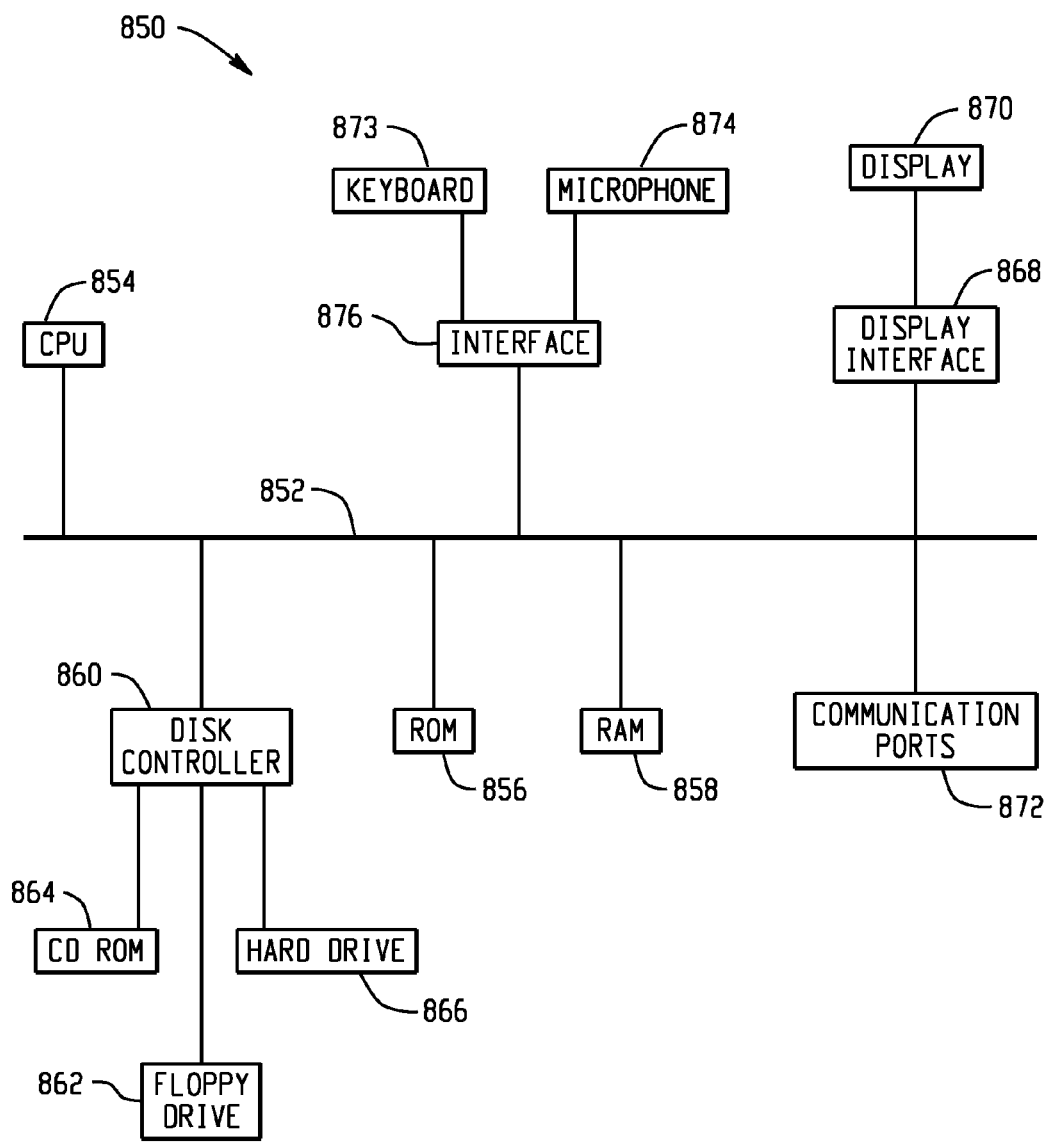

FIGS. 14A, 14B, and 14C depict examples of systems that may be used to optimize the distribution of advertisement information. For example, FIG. 14A depicts an example of a system 800 that includes a standalone computer architecture where a processing system 802 (e.g., one or more computer processors) includes a call tracking and optimization engine 804 being executed on it. The processing system 802 has access to a computer-readable memory 806 in addition to one or more data stores 808. The one or more data stores 808 may include call location data 810 and one or more advertisement distribution plans 812.

FIG. 14B depicts a system 820 that includes a client server architecture. One or more user PCs 822 access one or more servers 824 running call tracking and optimization engine programs 826 on a processing system 827 via one or more networks 828. The one or more servers 824 may access a computer readable memory 830 as well as one or more data stores 832. The one or more data stores 832 may contain call location data 834 and one or more advertisement distribution plans 836.

FIG. 14C shows a block diagram of an example of hardware for a standalone computer architecture 850, such as the architecture depicted in FIG. 14A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for determining an optimal advertisement distribution plan. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed
1. A system for optimizing the distribution of advertisement information, comprising:
 a processor configured to perform operations including:
  receiving call tracking data generated from telephone calls received by each of a plurality of businesses, the call tracking data including geographical information that identifies locations from which the telephone calls originated and associates each of the telephone calls with a particular one of the plurality of businesses that received the call;
  for each of the plurality of businesses, generating a probability density function based on the call tracking data, the probability density function for determining a probability that a telephone call will be received by the business in response to advertisement information delivered to a call location, wherein the probability density function expresses probability as a function of distance between the call location and the business;

for each of the plurality of businesses, using the probability density function to perform a plurality of simulations that predict calls to be generated in response to a distribution of advertisement information to call locations within a geographic area; and providing results of the plurality of simulations for use in generating an advertisement distribution plan for the geographic area.

2. The system of claim 1, wherein the operations further include:

for each of the plurality of businesses, determining a call distribution from the call tracking data that groups the call tracking data based at least in part on distances between one or more business locations and the locations from which the telephone calls originated, wherein the probability density function for each of the plurality of businesses is generated from the call distribution.

3. The system of claim 1, wherein the operations further include:

for each of the plurality of simulations, determining an optimal simulation result from each of the plurality of businesses, wherein the advertisement distribution plan is generated based, at least in part, on a combination of the optimal simulation results.

4. The system of claim 3, wherein the operations further include:

for each of the plurality of simulations, summing the optimal simulation results to generate an optimal value;

determining a mean of the optimal values from each of the plurality of simulations; identifying one of the plurality of simulations with optimal simulation results having a summation value that is closest to the mean; and generating the advertisement distribution plan based on the identified one of the plurality of simulations.

5. The system of claim 1, wherein the operations further include:

receiving demographic information relating to the geographic area, wherein the demographic information is used in generating the advertisement distribution plan.

6. A computer-program product for optimizing the distribution of advertisement information for a plurality of businesses, the computer program product tangibly embodied in a non-transitory, machine-readable storage medium, the storage medium storing instructions configured to cause a data processing apparatus to perform operations including:

receiving call tracking data generated from telephone calls received by each of the plurality of businesses, the call tracking data including geographical information that identifies locations from which the telephone calls originated and associates each of the telephone calls with a particular one of the plurality of businesses that received the call;

for each of the plurality of businesses, generating a probability density function based on the call tracking data, the probability density function for determining a probability that a telephone call will be received by the business in response to advertisement information delivered to a call location, wherein the probability density function expresses probability as a function of distance between the call location and the business;

for each of the plurality of businesses, using the probability density function to perform a plurality of simulations that predict calls to be generated in response to a distribution of advertisement information to call locations within a geographic area; and providing results of the plurality of simulations for use in generating an advertisement distribution plan for the geographic area.

7. The computer-program product of claim 6, wherein the operations further include:

for each of the plurality of businesses, determining a call distribution from the call tracking data that groups the call tracking data based at least in part on distances between one or more business locations and the locations from which the telephone calls originated, wherein the probability density function for each of the plurality of businesses is generated from the call distribution.

8. The computer-program product of claim 6, wherein the operations further include:

for each of the plurality of simulations, determining an optimal simulation result from each of the plurality of businesses, wherein the advertisement distribution plan is generated based, at least in part, on a combination of the optimal simulation results.

9. The computer-program product of claim 8, wherein the operations further include:

for each of the plurality of simulations, summing the optimal simulation results to generate an optimal value;

determining a mean of the optimal values from each of the plurality of simulations;

identifying one of the plurality of simulations with optimal simulation results having a summation value that is closest to the mean; and generating the advertisement distribution plan based on the identified one of the plurality of simulations.

10. The computer-program product of claim 6, wherein the operations further include:

receiving demographic information relating to the geographic area, wherein the demographic information is used in generating the advertisement distribution plan.

11. A computer-program product for optimizing the distribution of advertisement information, the computer program product tangibly embodied in a non-transitory, machine-readable storage medium, the storage medium storing instructions configured to cause a data processing apparatus to perform operations including:

receiving call tracking data generated from a plurality of telephone calls made to a business entity, the call tracking data including geographical information that identifies locations from which the plurality of telephone calls originated;

determining a call distribution from the call tracking data that groups the call tracking data based at least in part on distances between the business entity and the locations from which the plurality of telephone calls originated;

generating a probability density function from the call distribution, the probability density function for determining a probability that a telephone call will be received by the business entity in response to advertisement information delivered to a call location, wherein the probability density function expresses probability as a function of distance between the call location and the business entity; and providing the probability density function for generating an advertisement distribution plan.

12. The computer-program product of claim 11, wherein the call tracking data is received from a plurality of related business entities.

13. The computer-program product of claim 11, wherein the advertisement distribution plan identifies a predetermined distance from the business entity to distribute advertisement information.

14. The computer-program product of claim 12, wherein the advertisement distribution plan identifies a predetermined distance from each of the plurality of related business entities to distribute advertisement information.

15. The computer-program product of claim 11, wherein the geographical information includes information to identify geographical units from which the plurality of telephone calls originated, the call distribution is based at least in part on distances between the business entity and the geographical units from which the plurality of telephone calls originated, and the probability density function is for determining a probability that a telephone call will be received by the business entity in response to advertisement information delivered to a call location within a certain geographical unit.

16. The computer-program product of claim 15, wherein the geographical units are city blocks.

17. The computer-program product of claim 15, wherein the geographical units are based on postal codes.

18. The computer-program product of claim 16, wherein the operations further include:
receiving demographic information relating to the geographical units, wherein the demographic information is used in generating the advertisement distribution plan.

19. The computer-program product of claim 11, wherein the probability density function is generated by generating a step function based on the call distribution and fitting the step function to a curve.

20. The computer-program product of claim 11, wherein the call tracking data is generated from a sample of telephone call received by the business entity.

* * * * *